US010021600B2

(12) United States Patent
Wolf et al.

(10) Patent No.: US 10,021,600 B2
(45) Date of Patent: Jul. 10, 2018

(54) BACKHAUL TRAFFIC RELIABILITY IN UNLICENSED BANDS USING SPECTRUM SENSING AND CHANNEL RESERVATION

(71) Applicant: QUALCOMM Incorporated, San Diego, CA (US)

(72) Inventors: Guy Wolf, Hod HaSharon (IL); Assaf Touboul, Netania (IL); Shmuel Vagner, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 14/132,660

(22) Filed: Dec. 18, 2013

(65) Prior Publication Data
US 2014/0185497 A1 Jul. 3, 2014

Related U.S. Application Data

(60) Provisional application No. 61/748,326, filed on Jan. 2, 2013.

(51) Int. Cl.
*H04W 72/08* (2009.01)
*H04W 28/26* (2009.01)
(Continued)

(52) U.S. Cl.
CPC ............ *H04W 28/26* (2013.01); *H04L 1/20* (2013.01); *H04W 72/02* (2013.01); *H04W 92/20* (2013.01)

(58) Field of Classification Search
CPC ..... H04W 72/08; H04W 92/20; H04W 72/02; H04L 1/20
See application file for complete search history.

(56) References Cited

U.S. PATENT DOCUMENTS 7,512,094 B1* 3/2009 Linebarger ............ H04W 48/18
370/329
7,792,138 B2 9/2010 Hahm et al.
(Continued)

FOREIGN PATENT DOCUMENTS

JP 2008502231 A 1/2008
WO WO-2007106652 A2 9/2007
(Continued)

OTHER PUBLICATIONS

ISA/EPO, International Search Report and Written Opinion of the International Searching Authority, Int'l. App. No. PCT/US2013/077188, dated Jul. 3, 2014, European Patent Office, Rijswijk, NL, 9 pgs.

*Primary Examiner* — Noel R Beharry
*Assistant Examiner* — Ruihua Zhang
(74) *Attorney, Agent, or Firm* — Holland & Hart LLP

(57) ABSTRACT

Backhaul traffic reliability is improved in unlicensed spectrum bands by using cross-protocol channel sensing and reservation. Physical carrier sensing may be employed to scan channel quality of a plurality of carriers of an unlicensed spectrum band and select a carrier for use in a wireless backhaul communications link between a first base station and a second base station based on the scanned channel quality. The described features may further include the first base station transmitting a self-addressed reservation frame on the selected first carrier prior to transmission of backhaul data from the first base station to the second base station over the first carrier.

29 Claims, 12 Drawing Sheets

(51) Int. Cl.
 *H04W 72/02* (2009.01)
 *H04W 92/20* (2009.01)
 *H04L 1/20* (2006.01)

(56) References Cited

U.S. PATENT DOCUMENTS

| | | | |
|---|---|---|---|
| 8,089,982 B1* | 1/2012 | Vleugels | H04L 12/403 370/447 |
| 2006/0215601 A1 | 9/2006 | Vleugels et al. | |
| 2007/0242621 A1* | 10/2007 | Nandagopalan | H04L 12/413 370/254 |
| 2008/0082625 A1* | 4/2008 | Karaoguz | H04L 1/0003 709/217 |
| 2009/0131065 A1 | 5/2009 | Khandekar et al. | |
| 2010/0022261 A1 | 1/2010 | Meier et al. | |
| 2010/0054230 A1* | 3/2010 | Sridhara | H04W 72/0406 370/348 |
| 2012/0051334 A1 | 3/2012 | Sridhara et al. | |
| 2012/0063383 A1 | 3/2012 | Barbieri et al. | |
| 2012/0099576 A1* | 4/2012 | Li | H04W 74/0891 370/338 |
| 2012/0195244 A1* | 8/2012 | Wentink | H04B 1/713 370/311 |
| 2013/0155991 A1* | 6/2013 | Kazmi | H04W 24/02 370/329 |

FOREIGN PATENT DOCUMENTS

| | | |
|---|---|---|
| WO | WO-2008036937 A1 | 3/2008 |
| WO | WO-2009065075 A1 | 5/2009 |
| WO | WO-2011116240 A1 | 9/2011 |
| WO | WO-2012026857 A1 | 3/2012 |

\* cited by examiner

BACKHAUL TRAFFIC RELIABILITY IN UNLICENSED BANDS USING SPECTRUM SENSING AND CHANNEL RESERVATION

CROSS REFERENCES

The present application for patent claims priority to co-pending U.S. Provisional Patent Application No. 61/748,326 by Wolf et al., entitled "Backhaul Traffic Reliability in Unlicensed Bands Using Spectrum Sensing and Channel Reservation," filed Jan. 2, 2013, assigned to the assignee hereof, and expressly incorporated by reference herein.

BACKGROUND

Wireless communication networks are widely deployed to provide various communication services such as voice, video, packet data, messaging, broadcast, and the like. Wireless communication networks that include a number of base stations to provide coverage over a wide geographic area may be called cellular networks. These cellular networks may be multiple-access networks capable of supporting multiple users by sharing the available network resources.

Cellular networks have employed the use of various cell types, such as macrocells, microcells, picocells, and femtocells, to provide desired bandwidth, capacity, and wireless communication coverage within service areas. Some of the various types of cells may be used to provide wireless communication in areas of poor network coverage (e.g., inside of buildings), to provide increased network capacity, and to utilize broadband network capacity for backhaul. It may be desirable to distribute cells in areas where a direct network connection for providing backhaul is not available. Providing wireless backhaul to these cells provides challenges because of the high quality of service (QoS) requirements and limited backhaul spectrum availability.

Spectrum bands that permit unlicensed use have great potential for wireless backhaul. In the United States for example, unlicensed spectrum bands include spectrum around 915 MHz, 2.4 GHz, 3.4-3.8 GHz, 5 GHz, and 5.8 GHz in some areas. However, use of unlicensed spectrum bands presents challenges with regard to preserving channel reliability for carrier-grade deployments in the presence of licensed users and/or other wireless devices such as wireless local area network (WLAN) devices sharing the spectrum. For example, some bands may have primary users that have priority for use of channels within the band. Some bands may require unlicensed devices to detect the presence of licensed users and vacate the channel if the licensed users are detected. For example, Dynamic Frequency Selection (DFS) is a mechanism that allows unlicensed devices to use some bands already allocated to other uses without causing interference to the primary users. In addition, neighboring devices sharing the unlicensed band may generate bursty interference which may result in poor channel reliability. These and other issues may prevent effective deployment of carrier-grade wireless backhaul using unlicensed spectrum bands.

SUMMARY

The described features generally relate to one or more improved systems, methods, and/or apparatuses for improving backhaul traffic reliability in an unlicensed spectrum bands by using cross-protocol channel sensing and reservation. In embodiments, physical carrier sensing may be employed to select carriers in the unlicensed spectrum bands before transmitting via a backhaul communication link over the selected carriers. The selected backhaul traffic carriers may be time division duplexed or frequency division duplexed to provide bidirectional communication.

In a first set of illustrative embodiments, a method for wireless backhaul communications between a first base station and a second base station is described. The method may include scanning channel quality of a plurality of carriers of an unlicensed spectrum band and selecting, based on the scanned channel quality of the plurality of carriers, a first carrier for use in a wireless backhaul communications link between the first base station and the second base station. The method may further include transmitting, by the first base station, a first reservation frame on the first carrier prior to transmitting, from the first base station to the second base station over the first carrier, a first set of backhaul data in a first backhaul traffic frame.

In certain examples, the method may further include detecting interference on the first carrier. However, despite the detected interference, the first base station may proceed with transmitting the first backhaul traffic frame over the first carrier if it is determined that the detected interference level is below a predetermined threshold. The method further contemplates coordinating with the second base station a transmission, by the second base station, a second reservation frame on the first carrier partly concurrently with the transmitting of the first reservation frame. The second base station may then transmit to the first base station a second set of backhaul data time division duplexed within the first backhaul traffic frame over the first carrier.

In further examples, the method includes selecting, based on the scanned channel quality of the plurality of carriers, a second carrier for use in the wireless backhaul communications link, transmitting, by the second base station, a second reservation frame on the second carrier prior to transmission of a second backhaul traffic frame, detecting interference on the second carrier, and transmitting, from the second base station to the first base station over the second carrier, a second set of backhaul data in the second backhaul traffic frame.

In still further example, the method includes selecting, based on the scanned channel quality of the plurality of carriers, a second carrier for the wireless backhaul communications link for use subsequent to the first backhaul traffic frame, transmitting a second reservation frame on the second carrier prior to expiration of the first reservation frame, detecting interference on the second carrier, and transmitting a second set of backhaul data within a second traffic frame on the second carrier. In embodiments, scanning channel quality includes cyclicly determining channel quality of the plurality of carriers, and selecting a carrier includes updating the selected carrier responsive to determining that channel quality for the selected carrier is relatively lower than channel quality of one or more unselected carriers.

As contemplated in the examples, the first reservation frame may be a self-addressed reservation frame. The first reservation frame may include a frame duration value. The frame duration value may include a timer value substantially equal to a frame duration of the first backhaul traffic frame. The first reservation frame may be a clear to send (CTS) frame of a wireless local area network (WLAN) protocol. The first backhaul traffic frame may be a backhaul optimized traffic frame not compatible with the WLAN protocol. The unlicensed spectrum band may be a shared spectrum band open for use by wireless local area networks.

In yet further examples, the first base station may include a WLAN transceiver and a backhaul transceiver. The WLAN transceiver may perform scanning of channel quality of the plurality of carriers while the backhaul transceiver transmits the first traffic frame. The first base station may provide access for a plurality of user equipments (UEs) using a multiple access radio technology over a licensed spectrum band. The first base station may be a femto base station or a macro base station of the wireless communications network.

According to a second set of illustrative embodiments, an apparatus for wireless backhaul communications may include means for scanning channel quality of a plurality of carriers of an unlicensed spectrum band and means for selecting, based on the scanned channel quality of the plurality of carriers, a first carrier for use in a wireless backhaul communications link with a base station. The apparatus may further include means for transmitting a first reservation frame on the first carrier and means for transmitting a first set of backhaul data in a first backhaul traffic frame to the base station over the first carrier. In certain examples, the apparatus may further include means for implementing one or more aspects of the method for wireless communication described above with respect to the first set of illustrative embodiments.

According to a third set of illustrative embodiments, a computer program product for wireless backhaul between a first base station and a second base station of a wireless communications network may include a non-transitory computer-readable medium including code for causing a computer to scan channel quality of a plurality of carriers of an unlicensed spectrum band and code for causing the computer to select, based on the scanned channel quality of the plurality of carriers, a first carrier for use in a wireless backhaul communications link between the first base station and the second base station. The computer program product may further include code for causing the computer to transmit, by the first base station, a first reservation frame on the first carrier and code for causing the computer to transmit, from the first base station to the second base station over the first carrier, a first set of backhaul data in a first backhaul traffic frame. In certain examples the computer program product may be further implement one or more aspects of the method for wireless communication described above with respect to the first set of illustrative embodiments.

According to a fourth set of illustrative embodiments, a communications device for wireless backhaul communications between a first base station and a second base station of a wireless communications network may include at least one processor. The at least one processor may be configured to scan channel quality of a plurality of carriers of an unlicensed spectrum band and select, based on the scanned channel quality of the plurality of carriers, a first carrier for use in a wireless backhaul communications link between the first base station and the second base station. The processor may be further configured to transmit, by the first base station, a first reservation frame on the first carrier and transmit, from the first base station to the second base station over the first carrier, a first set of backhaul data in a first backhaul traffic frame. In certain examples, the at least one processor may be further configured to implement one or more aspects of the method for wireless communication described above with respect to the first set of illustrative embodiments.

Further scope of the applicability of the described methods and apparatuses will become apparent from the following detailed description, claims, and drawings. The detailed description and specific examples are given by way of illustrative only, as various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
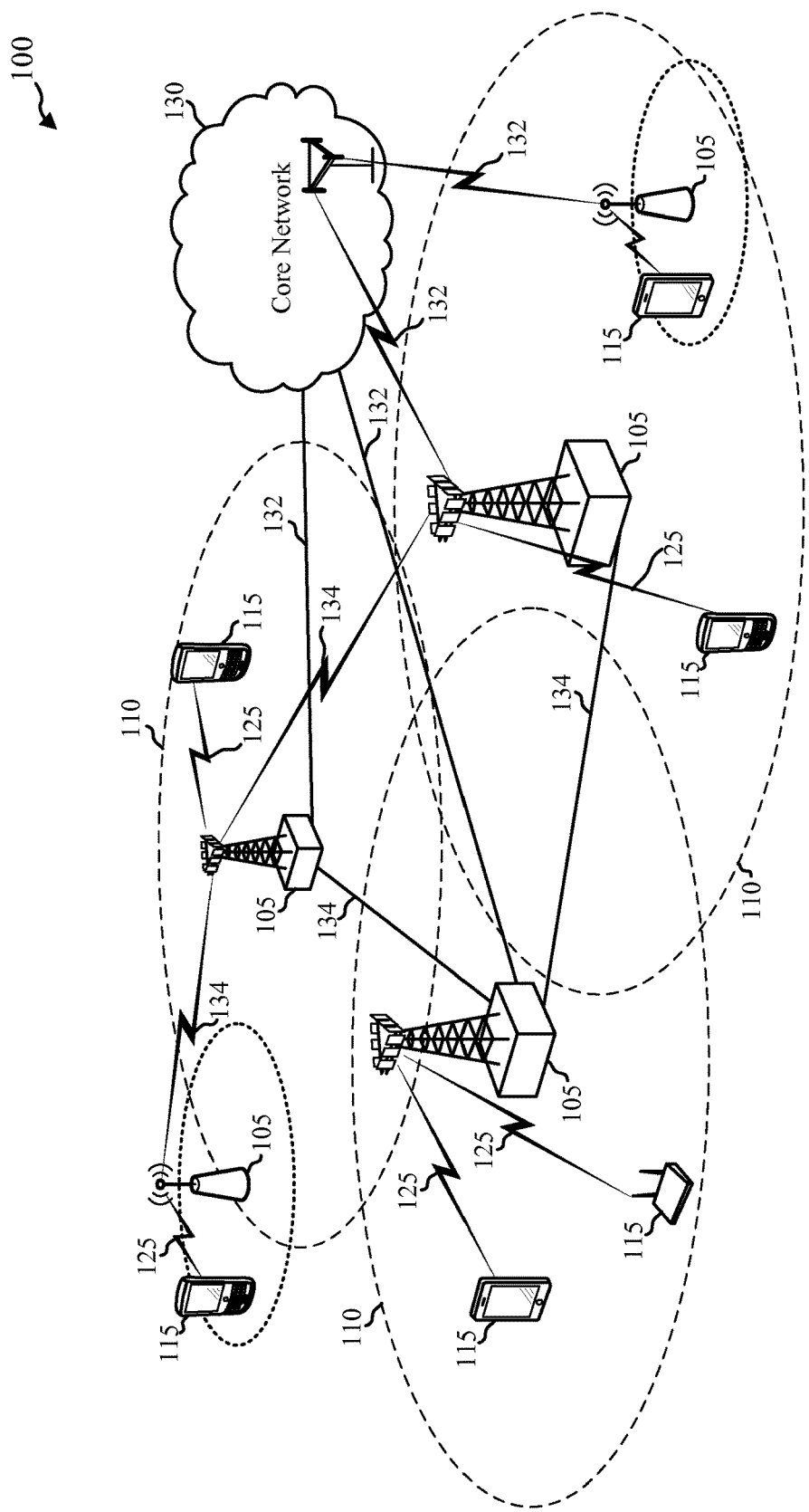
FIG. 1 is a diagram illustrating an example of a wireless communications system in accordance with various embodiments.

Described embodiments are directed to systems and methods for improving backhaul traffic reliability in unlicensed spectrum bands by using cross-protocol channel sensing and reservation. In embodiments, physical carrier sensing may be employed to select carriers in the unlicensed spectrum bands before transmitting via a backhaul communication link over the selected carriers. The selected backhaul traffic carriers may be time division duplexed or frequency division duplexed to provide bidirectional communication.

In embodiments, physical carrier sensing may be combined with virtual carrier sensing and channel reservation for wireless backhaul over unlicensed spectrum bands. In embodiments, base stations communicating over a wireless backhaul link utilize a wireless networking protocol for channel reservation and interference detection while employing a backhaul traffic protocol for backhaul traffic transmissions that is not compatible with the wireless networking protocol. In embodiments, channel reservation is coordinated by the base stations and each base station reserves selected carriers for backhaul communication.

In some embodiments, a base station may include the functionality of a backhaul transceiver and a wireless networking transceiver that communicate for backhaul frequency selection, channel reservation, and interference detection. The wireless networking transceiver may continuously sense the unlicensed band and select candidate channels for use in backhaul transmissions. The backhaul transceiver may send reservation frames on one or more of the candidate channels and the wireless networking transceiver may detect interference on the channels. The backhaul transceiver may transmit backhaul traffic frames on the reserved channels if the channels are available. The backhaul transceiver may monitor channel conditions and hop to other candidate channels depending on the monitored channel conditions.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

The core network 130 may communicate with the eNBs 105 via backhaul links 132 (e.g., S1 interface, etc.). The eNBs 105 may also communicate with one another, directly or indirectly, via backhaul links 134 (e.g., inter-eNB backhaul, X2 interface, etc.) and/or via backhaul links 132 (e.g., through core network 130). To provide a wide coverage area, some eNBs 105 may be located in places that do not have an existing backhaul infrastructure. In these instances, it may be difficult or expensive to provide wired backhaul between the eNBs 105 and the core network 130 and/or between eNBs 105 and other eNBs 105.

In various instances, backhaul links 132, 134 may be wireless backhaul links. Because of high QoS requirements, carrier-grade backhaul links generally use licensed or dedicated spectrum bands that are substantially free from other interfering devices. However, in many circumstances, licensed spectrum bands for wireless backhaul may be difficult or expensive to acquire. Many countries and regions have, in addition to licensed spectrum bands that are dedicated to a particular use or entity, unlicensed spectrum bands that may be used in a variety of ways. While unlicensed spectrum bands may not be dedicated to a particular use or provider, interference in the bands may be mitigated by technical rules governing both the hardware and deployment methods of radios using the band. The rules vary from band to band and countries have varying rules governing operational requirements and/or maximum transmission power in unlicensed bands.

Unlicensed spectrum bands may be divided into predefined frequency ranges or sub-bands. Generally, these frequency ranges are referred to herein as carriers, but may also be referred to as channels. Carriers may be overlapping or non-overlapping and may be made up of one or more sub-carriers (e.g., OFDM tones, etc.).

Common uses of unlicensed spectrum include cordless phones, garage door openers, wireless microphones, and wireless computer networking. Wireless computer networks include ad-hoc networks, personal area networks (e.g., Bluetooth, etc.), peer-to-peer networking, mesh networks, and WLANs. Most modern WLANs are based on IEEE 802.11 standards. These networks may also be known as "Wi-Fi" networks.

While offering potential for use in wireless backhaul, use of unlicensed spectrum bands in wireless backhaul presents significant challenges. In particular, carrier-grade communications have QoS requirements that are significantly higher than those of other unlicensed band communications such as wireless networking. In addition, point-to-point wireless backhaul systems typically use different communication protocols than wireless networking devices sharing the unlicensed spectrum bands.

The different aspects of system 100, such as the eNBs 105 and/or core network 130, may be configured to improve backhaul traffic reliability in unlicensed spectrum bands by using cross-protocol channel sensing and reservation. In embodiments, physical carrier sensing may be employed to select carriers in the unlicensed spectrum bands before transmitting via a backhaul communication link over the selected carriers. The selected backhaul traffic carriers may be time division duplexed or frequency division duplexed to provide bidirectional communication.

In embodiments, physical carrier sensing may be combined with virtual carrier sensing and channel reservation for wireless backhaul over unlicensed spectrum bands. In embodiments, base stations communicating over a wireless backhaul link utilize a wireless networking protocol for channel reservation and interference detection while employing a backhaul traffic protocol for backhaul traffic transmissions that is not compatible with the wireless networking protocol. In embodiments, channel reservation is coordinated by the base stations and each base station reserves selected carriers for backhaul communication.

In some embodiments, a base station may include the functionality of a backhaul transceiver and a wireless networking transceiver that communicate for backhaul frequency selection, channel reservation, and interference detection. The wireless networking transceiver may continuously sense the unlicensed band and select candidate channels for use in backhaul transmissions. The backhaul transceiver may send reservation frames on one or more of the candidate channels and the wireless networking transceiver may detect interference on the channels. The backhaul transceiver may transmit backhaul traffic frames on the reserved channels if the channels are available. The backhaul transceiver may monitor channel conditions and hop to other candidate channels depending on the monitored channel conditions.

Figure 2:
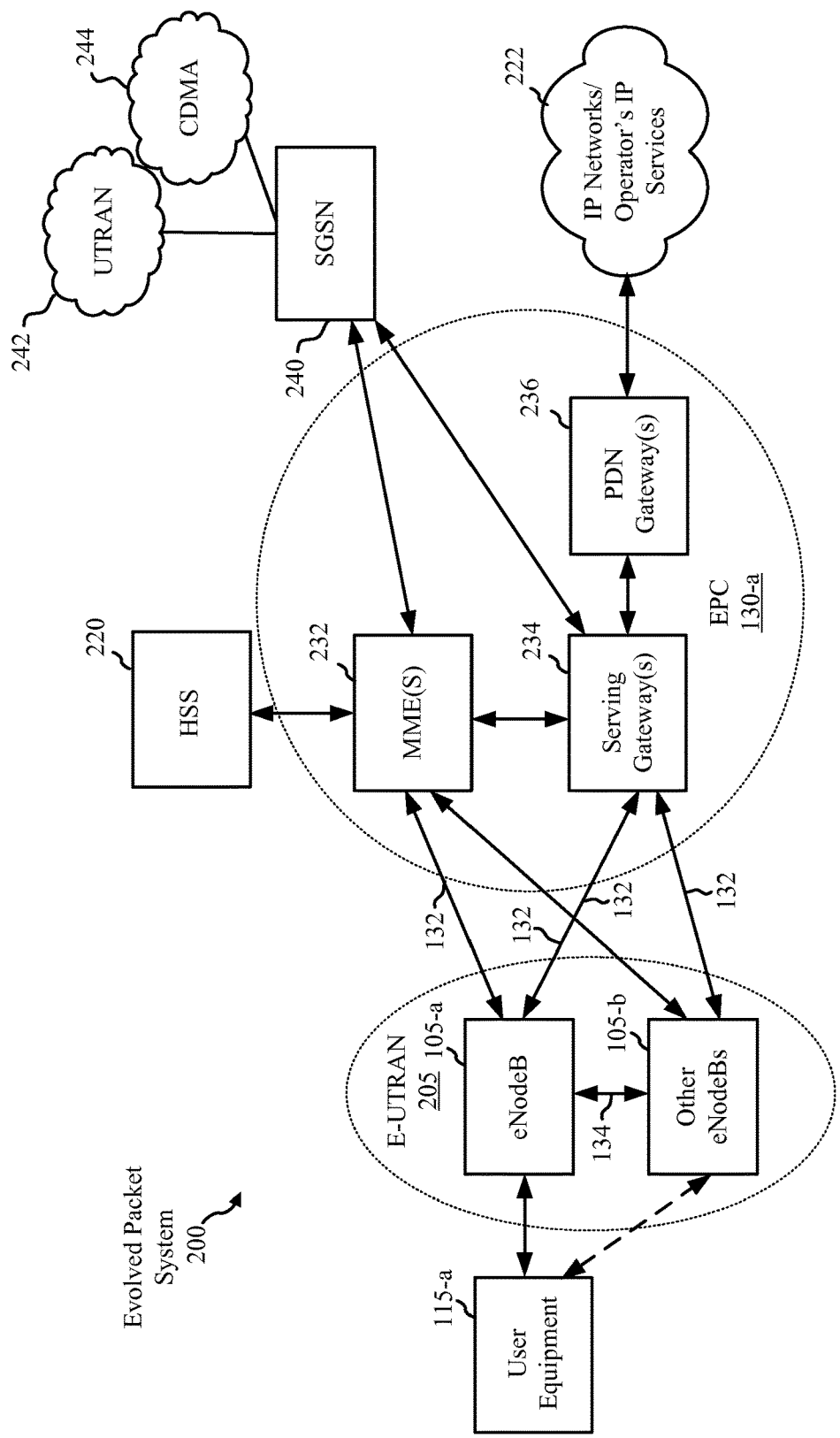
FIG. 2 is a diagram illustrating an LTE/LTE-Advanced network architecture in accordance with various embodiments.

FIG. 2 is a diagram illustrating an LTE/LTE-Advanced network architecture 200 in accordance with various embodiments. The LTE/LTE-A network architecture 200 may be referred to as an Evolved Packet System (EPS) 200.

The EPS 200 may include one or more UEs 115, an Evolved UMTS Terrestrial Radio Access Network (E-UTRAN) 205, an Evolved Packet Core (EPC) 130-a, a Home Subscriber Server (HSS) 220, and an Operator's IP Services 222. The EPS 200 may interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN 205 may include an eNB 105-a and other eNBs 105-b. The eNB 105-a may provide user plane and control plane protocol terminations toward the UE 115-a. The eNB 105-a may be connected to the other eNBs 105-b via an X2 interface (e.g., backhaul link 134). The eNB 105-a may provide an access point to the EPC 130-a for the UE 115-a. The eNB 105-a may be connected by an S1 interface (e.g., backhaul link 132) to the EPC 130-a. The EPC 130-a may include one or more Mobility Management Entities (MMEs) 232, one or more Serving Gateways 234, and one or more Packet Data Network (PDN) Gateways 236. The MME 232 may be the control node that processes the signaling between the UE 115-a and the EPC 130-a. Generally, the MME 232 may provide bearer and connection management. All user IP packets may be transferred through the Serving Gateway 234, which itself may be connected to the PDN Gateway 236. The PDN Gateway 236 may provide UE IP address allocation as well as other functions. The PDN Gateway 236 may be connected to IP networks and/or Operator's IP Services 222. The IP Networks/Operator's IP Services 222 may include the Internet, an Intranet, an IP Multimedia Subsystem (IMS), and/or a Packet-Switched (PS) Streaming Service (PSS). The EPS 200 may interconnect with other access networks using other Radio Access Technologies. For example, EPS 200 may interconnect with UTRAN network 242 and/or CDMA network 244 via one or more Serving GPRS Support Nodes (SGSNs) 240.

The UE 115-a may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Wireless networks 100 and/or 200 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

One or more of the backhaul links 132 and/or 134 of wireless networks 100 and/or 200 may be wireless backhaul links utilizing unlicensed spectrum bands. The wireless networks 100 and/or 200 may be configured to improve backhaul traffic reliability of the wireless backhaul links 132 and/or 134 by using cross-protocol channel sensing and reservation. Wireless backhaul links 132 and/or 134 may employ TDD or FDD techniques to provide bidirectional communication and may utilize multiple carriers.

In embodiments, physical carrier sensing may be used to select carriers in the unlicensed spectrum bands for transmissions on the wireless backhaul links 132 and/or 134. In embodiments, physical carrier sensing may be combined with virtual carrier sensing and channel reservation for wireless backhaul links 132 and/or 134. Base stations communicating over a wireless backhaul link may utilize a wireless networking protocol for channel reservation and interference detection while employing a backhaul traffic protocol for backhaul traffic transmissions that is not compatible with the wireless networking protocol. In embodiments, channel reservation is coordinated by the base stations and each base station reserves the selected carriers for backhaul communication.

In some embodiments, a base station may include the functionality of a backhaul transceiver and a wireless networking transceiver that communicate for backhaul frequency selection, channel reservation, and interference detection. The wireless networking transceiver may continuously sense the unlicensed band and select candidate channels for use in backhaul transmissions. The backhaul transceiver may send reservation frames on one or more of the candidate channels and the wireless networking transceiver may detect interference on the channels. The backhaul transceiver may transmit backhaul traffic frames on the reserved channels if the channels are available. The backhaul transceiver may monitor channel conditions and hop to other candidate channels depending on the monitored channel conditions.

Figure 3:
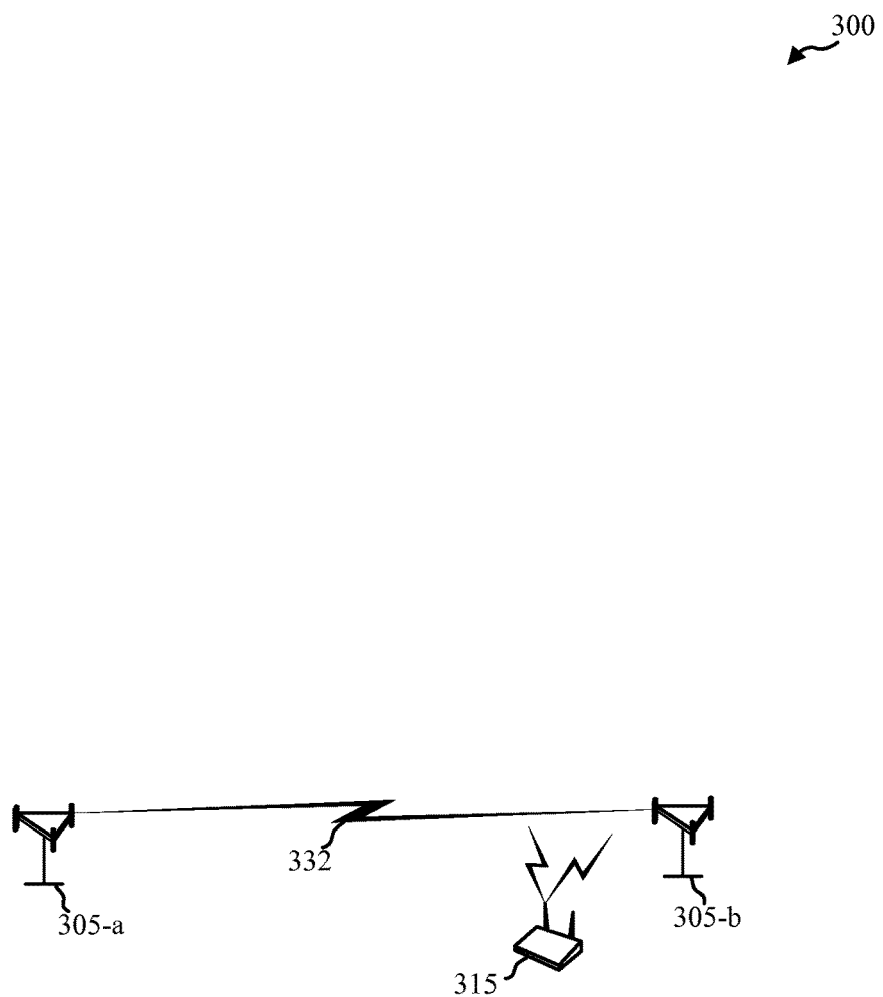
FIG. 3 illustrates aspects of a wireless communications network for supporting wireless backhaul in accordance with various embodiments.

FIG. 3 illustrates aspects of a wireless communications network 300 for supporting wireless backhaul in accordance with various embodiments. FIG. 3 may illustrate, for example, various aspects of wireless networks 100 and/or 200. Wireless communications network 300 includes a base station 305-*a* and a base station 305-*b* in communication over a wireless backhaul link 332. Wireless backhaul in accordance with the described embodiments may be used in a variety of network topologies for communication between a variety of network nodes and/or base stations. For example, base station 305-*a* may be serving as Feeder Base Station (FBS) for base station 305-*b*, which may be a Remote Base Station (RBS). In other examples, base stations 305-*a* and 305-*b* are eNBs 105 of wireless networks 100 and/or 200 and wireless backhaul link 332 is an inter-eNB backhaul link (e.g., X2 interface, etc.). In yet other examples, base stations 305-*a* and 305-*b* are part of the same base station subsystem (BSS). For example, wireless backhaul link 332 may be used to connect a Base Station Controller (BSC) to one or more Base Transceiver Stations (BTSs) in a UTRAN network architecture, or to connect a Base Band Unit (BBU) to one or more Remote Radio Heads (RRHs) in an E-UTRAN network architecture. Therefore, the term "base station," as used herein, may refer broadly to any node or subsystem of wireless communication networks 100 and/or 200 applying the disclosed techniques for wireless backhaul.

In embodiments, base stations 305-*a* and 305-*b* establish communication link 332 over one or more unlicensed spectrum bands. Base stations 305-*a* and/or 305-*b* may utilize directional antennas also called narrow-beam point to point (PTP) antennas. The one or more unlicensed spectrum bands may be shared with other wireless communication devices such as WLAN device 315. Potential problems may be caused by other devices that may randomly access carriers within the unlicensed spectrum bands, causing interference known as the "hidden node problem." For example, WLAN device 315 may access the same carriers used by nodes 305-*a* and 305-*b* for wireless backhaul. Because the wireless backhaul link 332 may use narrow-beam transmissions, WLAN device 315 may sense the wireless backhaul link 332 at low power levels. Thus, even though the carrier may be in use by the base stations 305-*a* and 305-*b* for wireless backhaul, the WLAN device 315 may sense the carrier as clear for transmission. WLAN device 315 may then transmit on the carrier and cause interference to the backhaul link 332.

The different aspects of systems 100, 200, and or 300, such as the base stations 305, may be configured to improve backhaul traffic reliability in unlicensed spectrum bands by using cross-protocol channel sensing and reservation. In embodiments, physical carrier sensing may be employed to select carriers in the unlicensed spectrum bands before transmitting via a backhaul communication link over the selected carriers. The selected backhaul traffic carriers may be time division duplexed or frequency division duplexed to provide bidirectional communication.

In embodiments, physical carrier sensing may be combined with virtual carrier sensing and channel reservation for wireless backhaul over unlicensed spectrum bands. In embodiments, base stations communicating over a wireless backhaul link utilize a wireless networking protocol in use in the unlicensed bands for channel reservation and interference detection while employing a backhaul traffic protocol for backhaul traffic transmissions that is not compatible with the wireless networking protocol. In embodiments, channel reservation is coordinated by the base stations and each base station reserves selected carriers for backhaul communication.

In some embodiments, a base station may include the functionality of a backhaul transceiver and a wireless networking transceiver that communicate for backhaul frequency selection, channel reservation, and interference detection. The wireless networking transceiver may continuously sense the unlicensed band and select candidate channels for use in backhaul transmissions. The backhaul transceiver may send reservation frames on one or more of the candidate channels and the wireless networking transceiver may detect interference on the channels. The backhaul transceiver may transmit backhaul traffic frames on the reserved channels if the channels are available. The backhaul transceiver may monitor channel conditions and hop to other candidate channels depending on the monitored channel conditions.

Figure 4:
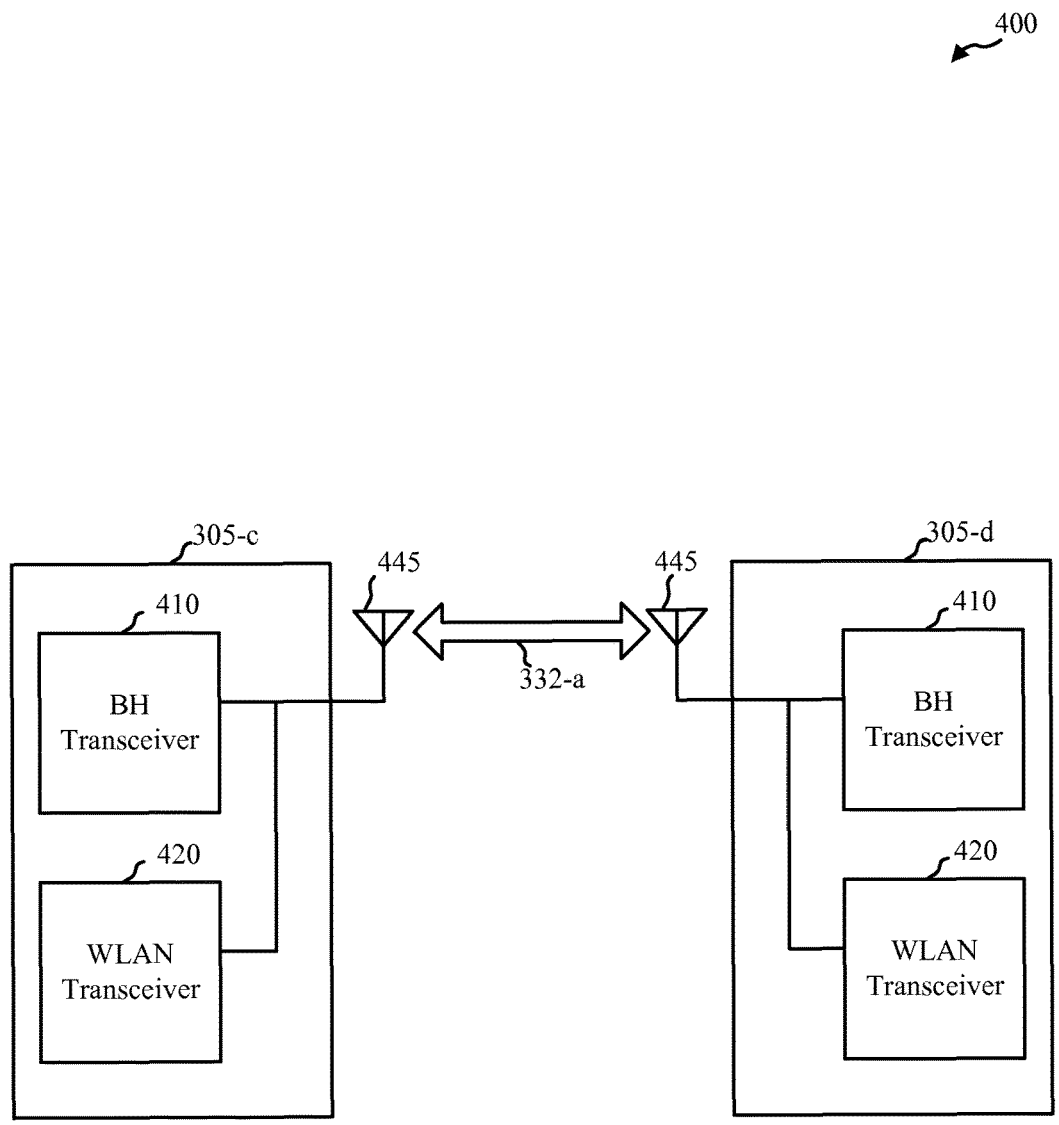
FIG. 4 illustrates a block diagram of a system for supporting wireless backhaul in accordance with various embodiments.

FIG. 4 illustrates a block diagram of a system 400 for supporting wireless backhaul over unlicensed spectrum bands in accordance with various embodiments. System 400 includes a first base station 305-*c* and a second base station 305-*d* in communication over wireless backhaul communication link 332-*a*. Base stations 305-*c* and/or 305-*d* may be, for example, eNBs 105, network entities (e.g., MME 232, Serving GW 234, etc.), and/or other nodes of wireless communication networks 100 and/or 200. The base stations 305-*c* and 305-*d* may include a backhaul transceiver 410 for backhaul communications with other base stations 105 and a WLAN transceiver 420. Backhaul transceivers 410 and WLAN transceivers 420 may transmit and receive using antenna(s) 445. Backhaul transceiver 410 and WLAN transceiver 420 may use the same antenna(s) 445, or, in embodiments, backhaul transceiver 410 and WLAN transceiver 420 may use different antenna(s) 445.

Wireless backhaul communication link 332-*a* may be a narrow-beam PTP communication link over one or more unlicensed spectrum bands. In embodiments, WLAN transceiver 420 may scan channel quality of the unlicensed band. For example, WLAN transceiver 420 may determine channel quality metrics such as received signal strength indication (RSSI) and/or carrier to interference+noise ratio (CINR) across the unlicensed band. Based on these metrics, the WLAN transceiver 420 may select candidate carriers or sub-bands for use in backhaul link 332-*a* between base station 305-*c* and base station 305-*d*. WLAN transceiver 420 may also employ Dynamic Frequency Selection (DFS) to avoid carriers in use by primary users as is known in the art.

In some embodiments, base stations 305-*c* and 305-*d* may coordinate to select candidate carriers within the unlicensed band. The backhaul transceivers 410 may then communicate over the wireless backhaul communication link using the selected carriers. The backhaul transceivers 410 may use a backhaul transmission protocol for transmission of backhaul data that is incompatible with the protocol WLAN used by WLAN devices that share the unlicensed spectrum band. In embodiments, the backhaul transceivers 410 may detect interference on the selected carriers and hop to other candidate carriers based on detected interference.

In some embodiments, the base stations 305-*a* and/or 305-*b* perform reservation of selected carriers prior to transmission. For example, channel access may be based on collision avoidance techniques such as carrier sense multiple avoidance (CMSA) and/or CMSA with collision avoidance (CMSA/CA). These techniques allow devices to sense the carrier and verify that it is interference free before starting its own transmissions. Carrier sensing can be physical by sensing energy in the channel or virtual based on protocols to avoid channel collisions. For example, virtual carrier sensing may be based on channel reservation frames that include a "duration" field. Each receiver device includes internal counters (e.g., network allocation vector (NAV), etc.) that track the reserved time periods for one or more carriers. Other devices may refrain from operating on the carriers during the reserved time periods.

Figure 5:
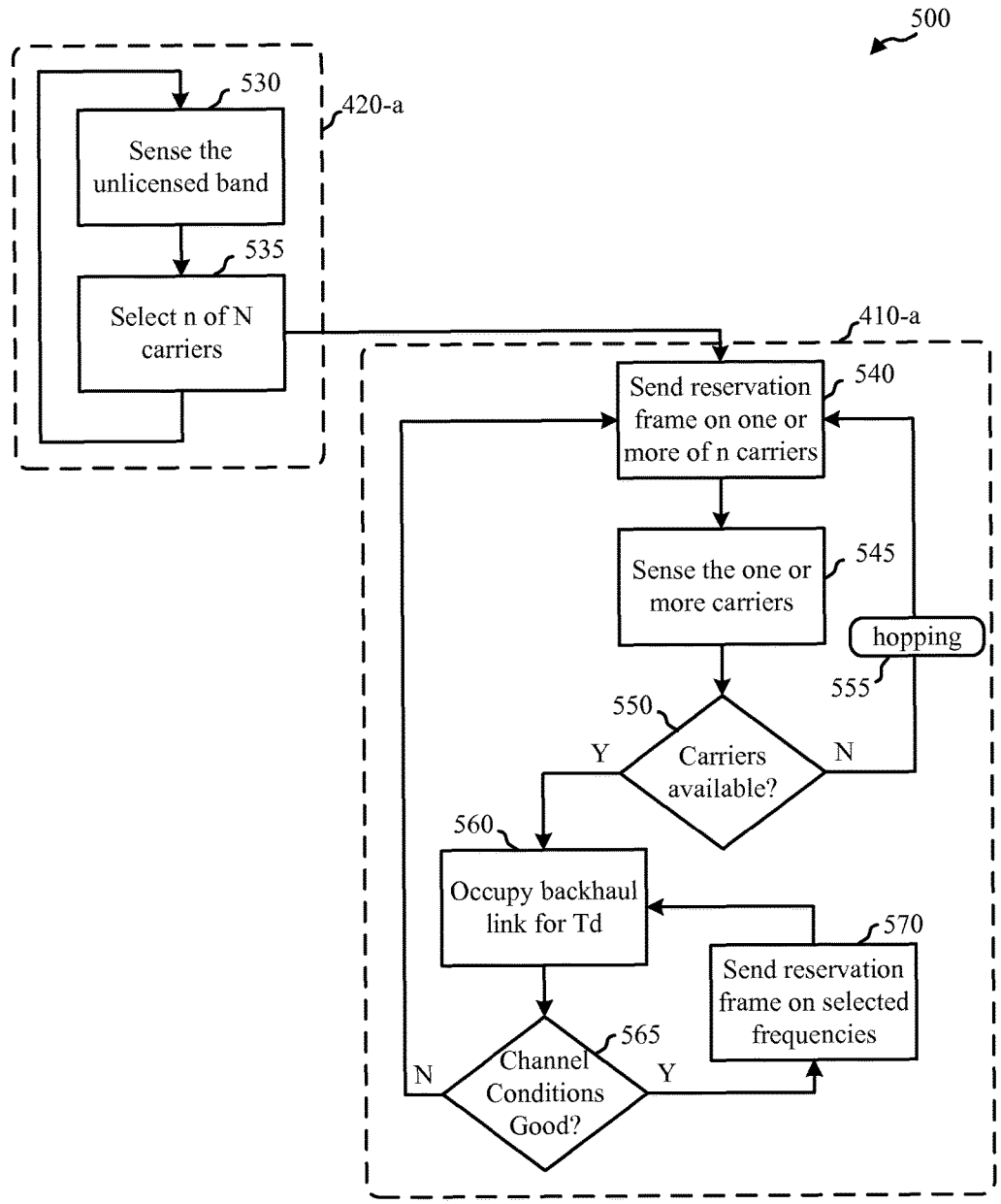
FIG. 5 is a functional block diagram that illustrates a flow for supporting wireless backhaul in accordance with various embodiments.

FIG. 5 is a functional block diagram that illustrates a flow 500 for supporting wireless backhaul in accordance with various embodiments. Flow 500 may be used, for example, by nodes of wireless communication networks 100, 200, and/or 300 of FIGS. 1, 2, and/or 3 for establishing wireless backhaul communication links over one or more carriers of an unlicensed spectrum band.

Flow 500 includes blocks 530 and 535 for sensing channel conditions of the band and selecting candidate carriers within the band. For example, RSSI and/or CINR may be sensed across the unlicensed band at block 530 and one or more carriers may be selected at block 535 having the highest channel quality (e.g., lowest RSSI, etc.). Selection of candidate carriers may take density of interfering transmissions within the band into account. Blocks 530 and 535 may be performed continuously to maintain a list of candidate carriers (e.g., n carriers of N total carriers within the band, etc.) for backhaul transmission.

At block 540, one or more of the candidate carriers may be selected for backhaul transmission. A reservation frame may be sent on the one or more selected carriers for channel reservation of the selected carriers. The reservation frame may be sent according to a WLAN protocol of WLAN devices that share the unlicensed spectrum band. For example, a Clear-to-Send (CTS) frame may be sent on the selected carriers. The reservation frame may be sent using a receiving address of the reserving base station (e.g., CTS2Self frame, etc.). The reservation frame may include a duration and the duration may correspond to a backhaul frame period. At block 545, the selected carriers may be monitored for interference after sending the reservation frame. If, at block 550, interference that would prevent robust wireless backhaul communication over the carrier is detected, flow 500 may proceed to hop frequencies at block 555 and retry the reservation procedure from block 540. For example, different carriers from the list of candidate carriers may be selected and reservation frames may be sent on the new carriers to reserve the carriers for backhaul communication.

In the absence of interference that would prevent robust wireless backhaul communication over the carrier, flow 500 may proceed from block 550 to block 560 where one or more backhaul frames may be sent over the selected carriers. For example, where the duration set in the CTS frame corresponds to a backhaul frame period, one backhaul frame may be transmitted on the selected carrier at block 560. During transmission of the backhaul frames at block 560, the channel conditions using the selected carriers may be monitored. For example, channel conditions may be determined using ACK/NACK information and/or bit error rate (BER) of the transmitted backhaul frames. If, at block 565, the channel conditions are good, the carrier may be used for additional transmissions by resending CTS frames on the selected frequencies at block 570 and sending additional backhaul frames at block 560.

The various blocks of flow 500 may be performed using one or more transceiver blocks in communication with each other. According to the architecture of FIG. 5, a WLAN transceiver 420-a may perform the carrier sensing and candidate carrier selection in blocks 530 and 535 while channel reservation, frequency hopping, and backhaul transmission are performed by a backhaul transceiver 410-a. In some embodiments, the WLAN transceiver 420-a may perform the channel reservation and frequency hopping functions illustrated in flow 500. For example, the WLAN transceiver 420-a may send reservation frames in blocks 540 and 570, sense the carriers in block 545, perform carrier hopping in block 555, and communicate with the backhaul transceiver for transmission of backhaul traffic frames by the backhaul transceiver over the reserved carriers at block 560.

In some embodiments, out-of-band reservation frames may be transmitted by WLAN transceiver 420-a, while in-band reservation frames are transmitted by the backhaul transceiver 410-a. For example, reservation frames sent on candidate carriers not currently in use by the backhaul transceiver 410-a may be transmitted by the WLAN transceiver 420-a. Once the backhaul transceiver 410-a is using a carrier for transmission of backhaul traffic frames, the backhaul transceiver 410-a may transmit reservation frames on the in-band carrier.

As described above, wireless backhaul between base stations 305 may be bidirectional and the base stations 305 may communicate with each other to select carriers, reserve selected carriers, and monitor reserved carriers for interference. For example, the candidate set of carriers for the unlicensed band may be determined according to channel quality measurements performed by both of the base stations 305 communicating over the wireless backhaul link.

Figure 6:
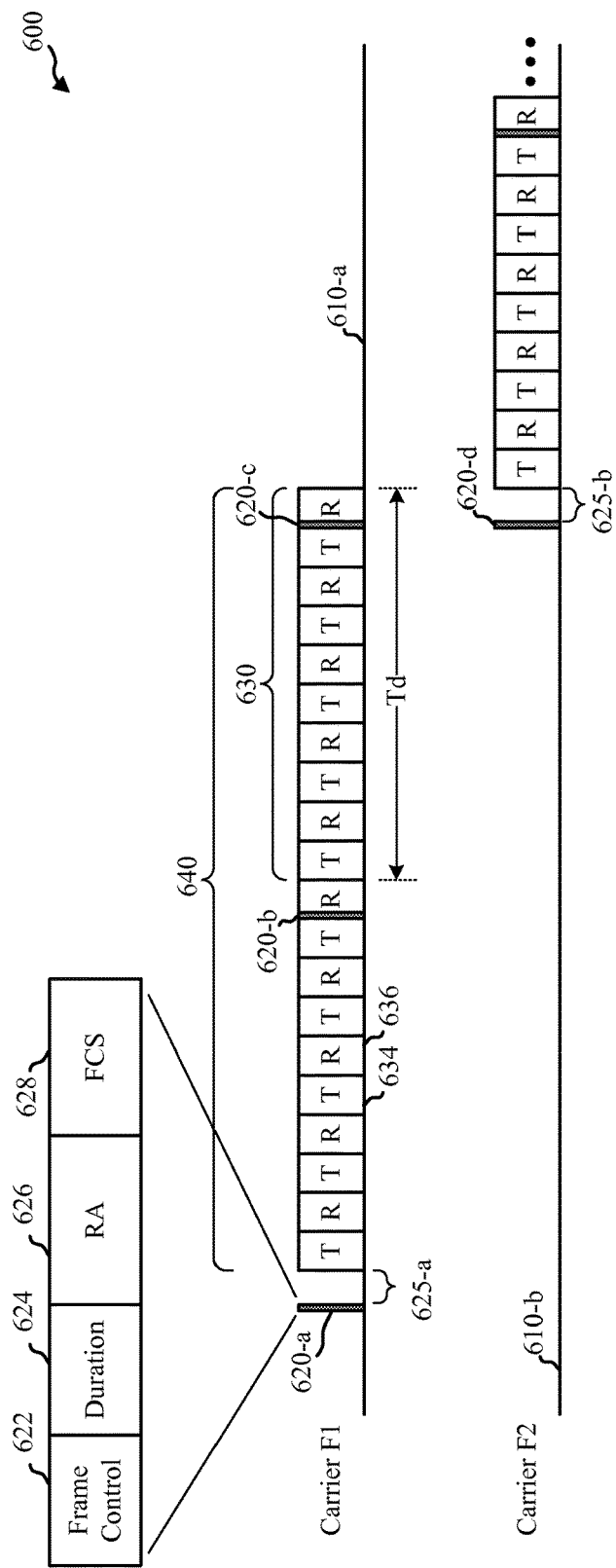
FIG. 6 is a timing diagram that illustrates an example wireless backhaul communication between base stations over an unlicensed spectrum band in accordance with various embodiments.

FIG. 6 is a timing diagram 600 that illustrates an example wireless backhaul communication between base stations over an unlicensed spectrum band in accordance with various embodiments. Timing diagram 600 may illustrate, for example, wireless backhaul communication links 332 between base stations 305 of FIGS. 3 and/or 5, or wireless backhaul communication links 132 and/or 134 of FIGS. 1 and/or 2. Timing diagram 600 may illustrate TDD communication in backhaul traffic frames 630. Timing diagram 600 may illustrate a wireless backhaul communication link from the perspective of a base station (e.g., RBS, etc.) Backhaul traffic frames 630 may include one or more transmitted subframes 634 (e.g., from an FBS to an RBS, etc.) and one or more received subframes 636 (e.g., transmitted from the RBS to the FBS, etc.).

In timing diagram 600, a first reservation frame 620-a (e.g., CTS frame, etc.) may be sent on a first carrier 610-a. The reservation frame 620 may include a frame control field 622, duration field 624, receiver address (RA) field 626, and frame check sequence (FCS) field 628. The reservation frame 620 may be self-addressed reservation frame (e.g., CTS2Self frame). In self-addressed reservation frame, the base station sends the reservation frame 620-a with RA address 626 set to its own address (e.g., MAC address, and the like) and the duration 624 set to the expected duration of the transmission sequence. Other devices that receive the CTS2Self frame 620-a should remain quiet during the indicated duration period even if they are not able to receive or decode the data transmission from the base station.

The carrier 610-a may be monitored during the time period 625-a for interference before the carrier 610-a is used for backhaul transmission. The reservation frame 620-a may include a duration 640 for carrier reservation. Reservation frames may be transmitted at a periodic interval. For example, reservation frames 620-b and 620-c may be transmitted at periodic intervals during the transmission and may include duration fields whose values correspond to the remainder of the duration 640.

At some point, channel conditions may deteriorate on the first carrier 610-a and the base stations may decide to hop to a second carrier. A second carrier 610-b may be selected for backhaul transmission from among the candidate carriers determined by sensing the unlicensed band. To assure that handoff to the second carrier 610-*b* will be completed without interruption to the backhaul transmission link, a reservation frame 620-*d* may be sent on the second carrier 610-*b* to reserve the second carrier 610-*b* prior to using the second carrier 610-*b* for backhaul data transmission. The second carrier 610-*b* may be sensed during a time period 625-*b* immediately following the reservation frame 620-*d*, and the backhaul transmissions may begin on the second carrier 610-*b* based on an acceptable level of interference on the second carrier 610-*b*.

In embodiments, reservation frame 620-*d* may occur prior to the end of the duration 640 to facilitate uninterrupted carrier hopping. For example, reservation frame 620-*d* may be transmitted on the second carrier 610-*b* prior to expiration of the reserved duration 640 on the first carrier 610-*a*. If interference is detected during sensing of the second carrier at time period 625-*b*, the backhaul communications may be continued on the first carrier 610-*a* for the remainder of the reserved duration. Another carrier from the candidate carriers may be selected and a reservation frame sent on that carrier to reserve the carrier for interruption-free carrier hopping. While FIG. 6 illustrates the cross-protocol channel reservation and carrier hopping techniques used in a TDD backhaul communication link, similar techniques may be applied to FDD backhaul communication links.

Figure 7:
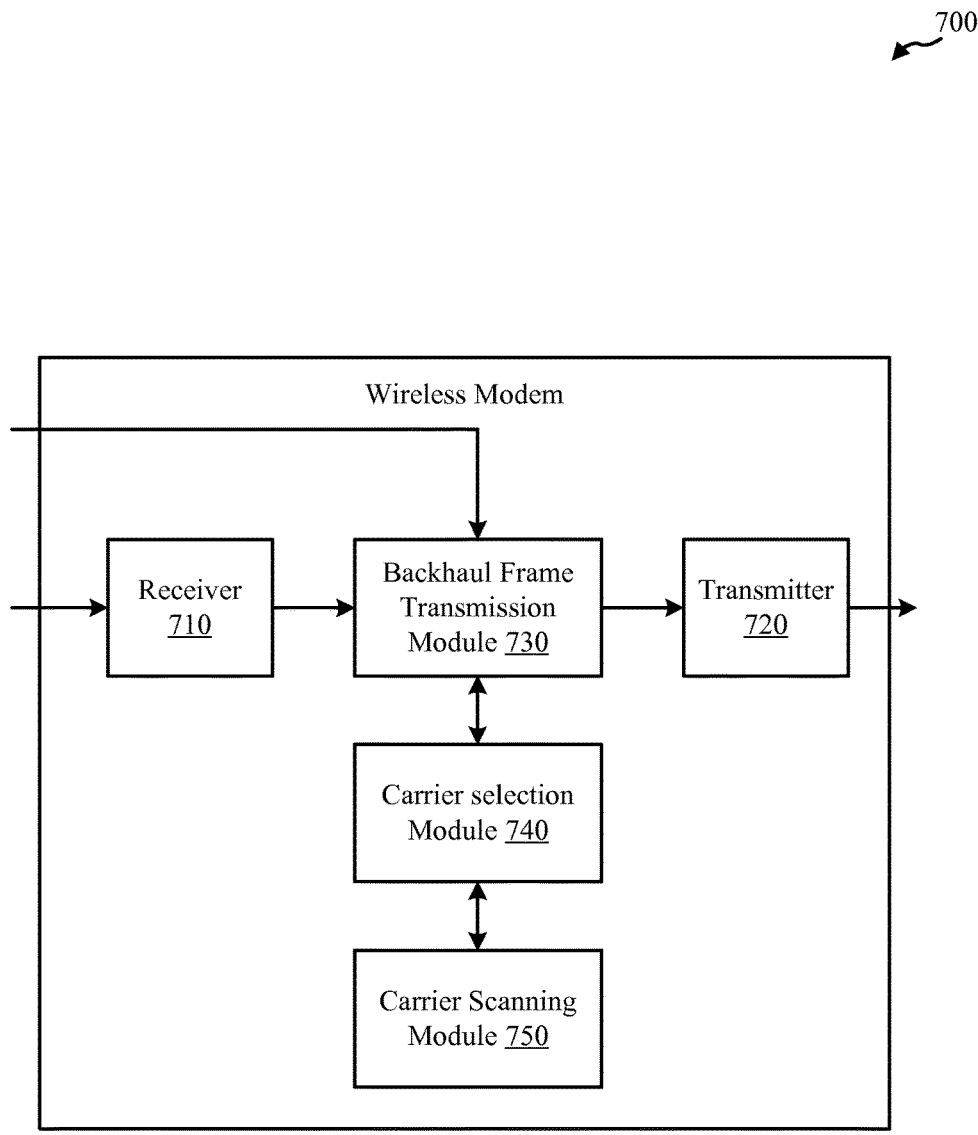
FIG. 7 shows a block diagram of a wireless modem that may be employed for supporting wireless backhaul in accordance with various embodiments.

Turning next to FIG. 7, a block diagram of a wireless modem 700 that may be employed for supporting wireless backhaul over unlicensed bands is illustrated in accordance with various embodiments. The wireless modem 700 may illustrate one or more aspects of base stations 105 described with reference to FIGS. 1, 2, and/or 3. The wireless modem 700 may also be a processor or implemented at least in part by a processor. The wireless modem 700 may include a receiver module 710, transmitter module 720, backhaul frame transmission module 730, carrier selection module 740, and channel scanning module 750. Each of these components may be in communication with each other. The wireless modem 700 and/or its components may be configured to send and/or receive backhaul communications from other devices such as other base stations 305.

Carrier scanning module 750 may scan channel quality for carriers within an unlicensed spectrum band. For example, carrier scanning module 750 may determine RSSI and/or CINR may across the unlicensed band. Carrier selection module 740 may select, based on the scanned channel quality, one or more candidate carriers for backhaul transmissions. For example, carrier selection module 740 may select a subset of carriers of the unlicensed band having the lowest interference (e.g., lowest RSSI, etc) as candidate carriers. Carrier selection module 740 may take the density of interfering transmissions on channels within the band into account when selecting the candidate carriers. For example, a higher density of interfering transmissions within a given time period may indicate higher activity level on particular channels and carrier selection module 740 may avoid those channels. Channels with more highly intermittent activity may be better suited to backhaul transmissions even where the interfering transmissions have a higher received signal level. In embodiments, carrier selection module 740 may weight received interference levels and density of interfering transmissions within the band in selecting candidate carriers for backhaul transmission. In embodiments, carrier selection module 740 communicates with a carrier selection module of another base station to determine the set of candidate carriers with the highest channel quality for backhaul transmissions between the base stations.

Backhaul frame transmission module 730 transmits backhaul traffic frames over a backhaul transmission link that includes one or more of the selected carriers. Backhaul frame transmission module 730 may communicate with other base stations over TDD or FDD backhaul transmission links Where the base stations utilize a TDD backhaul transmission link, each base station may transmit a channel reservation frame (e.g., CTS2Self frame, etc.) on a carrier to reserve the carrier for transmission of one or more backhaul frames between the base stations over the TDD backhaul transmission link. Where the base stations utilize FDD backhaul transmission links, the base stations may transmit channel reservation frames on their transmission carriers, or, in some embodiments, on both transmission and reception carriers.

Components of the wireless modem 700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

Figure 8:
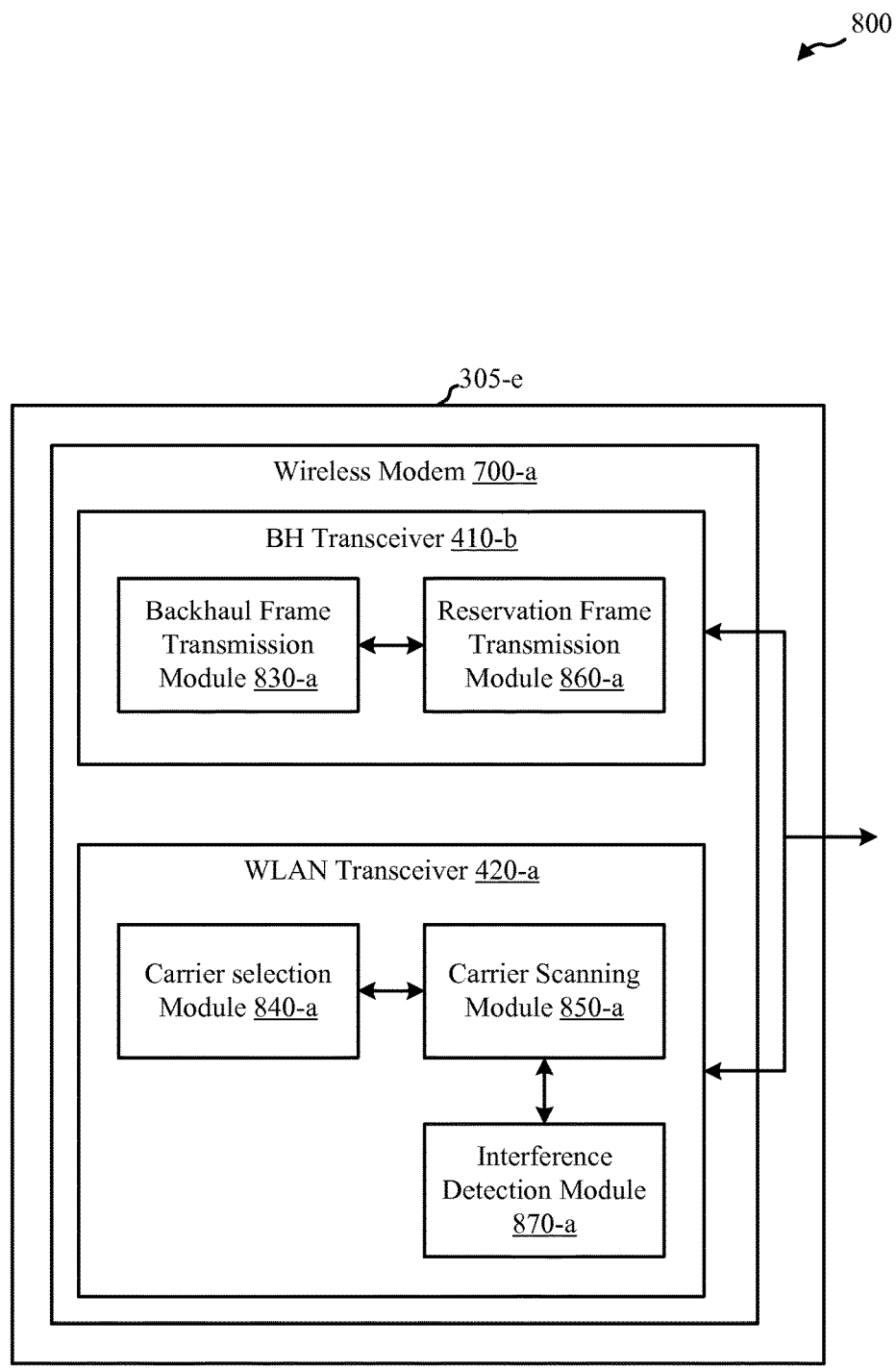
FIG. 8 is a block diagram illustrating aspects of a base station for supporting wireless backhaul in accordance with various embodiments.

FIG. 8 is a block diagram 800 of a base station 305-*e* for supporting wireless backhaul over unlicensed spectrum bands in accordance with various embodiments. The base station 305-*e* may illustrate, for example, aspects of eNBs 105 and/or various network entities (e.g., MME 232, Serving GW 234, etc.) for supporting wireless backhaul. Similarly to base stations 305-*c* and 305-*d*, the base station 305-*e* may include a backhaul transceiver 410-*b* for backhaul communications with other base stations 105 and a WLAN transceiver 420-*b*. The components of the base station 305-*e* may be implemented in whole or in part with a wireless modem 700-*a*. The wireless modem 700-*a* of the present example may be configured to implement aspects discussed above with respect to the wireless modem 700 of FIG. 7 and may not be repeated here for the sake of brevity. For example, WLAN transceiver 420-*b* may include a carrier selection module 840-*a* and a channel scanning module 850-*a*, which may include similar functionality as the carrier selection module 740 and channel scanning module 750, respectively. WLAN transceiver 420-*b* may also include an interference detection module 870-*a*.

Backhaul transceiver 410-*b* may include a backhaul frame transmission module 830-*a* and a reservation frame transmission module 860-*a*. Backhaul transceiver 410-*b* may communicate with WLAN transceiver 420-*b* to perform physical and virtual carrier sensing and channel reservation for wireless backhaul over unlicensed spectrum bands. WLAN transceiver 420-*b* may perform physical carrier sensing and select candidate carriers for backhaul transmission over the unlicensed band based on the physical carrier sensing. Backhaul transceiver 410-*b* may receive the selected carriers and perform channel reservation for one or more selected carriers. For example, reservation frame transmission module 860-*a* may transmit reservation frames on one or more selected carriers. Interference detection module 870-*a* may monitor the carriers after transmission of the reservation frames for interference before the carriers are used for backhaul transmission. Where interference is detected on selected carriers, backhaul transceiver 410-*b* may hop to other carriers and proceed with carrier reservation on the new carriers.

Figure 9:
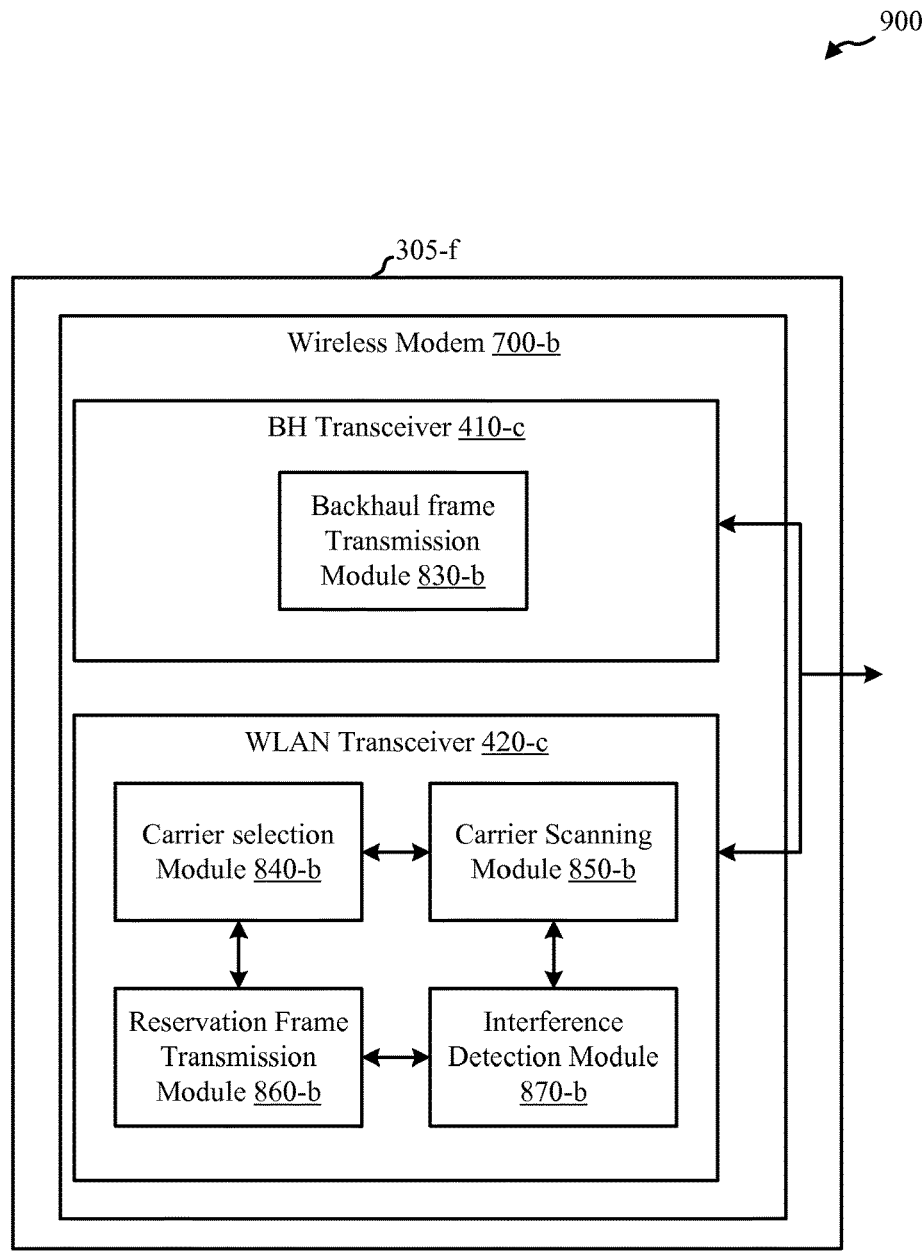
FIG. 9 is a block diagram illustrating aspects of a base station for supporting wireless backhaul in accordance with various embodiments.

In embodiments, the WLAN transceiver 420 may perform channel reservation as well as interference detection. FIG. 9 is a block diagram 900 illustrating an alternative embodiment of a base station 305-*f* for supporting wireless backhaul over unlicensed spectrum bands in accordance with various embodiments. The base station 305-*f* may illustrate, for example, aspects of eNBs 105 and/or various network entities (e.g., MME 232, Serving GW 234, etc.) for supporting wireless backhaul. Base station 305-*f* may include a backhaul transceiver 410-*c* for backhaul communications with other base stations 105 and a WLAN transceiver 420-*c*. The components for base station 305-*f* may be implemented in whole or in part by at least one wireless modem 700-*b*. The wireless modem 700-*b* of the present example may be an example of one or more of the wireless modems 700 of FIGS. 7-8 and may not be repeated here for the sake of brevity.

As illustrated in FIG. 9, the WLAN transceiver 420-*c* may include carrier selection module 840-*b*, carrier scanning module 850-*b*, reservation frame transmission module 860-*b*, and/or interference detection module 870-*b*. According to the architecture of FIG. 9, the WLAN transceiver 420-*c* may perform physical and virtual carrier sensing as well as carrier reservation for backhaul transmission links. For example, the WLAN transceiver 420-*c* may, via reservation frame transmission module 860-*b* and interference detection module 870-*b*, transmit reservation frames and monitor interference on selected carriers, communicating with backhaul frame transmission module 830-*b* for transmission of backhaul traffic frames on the reserved carriers. As described above, WLAN transceiver 420-*c* may perform out-of-band carrier reservation while backhaul transceiver 410-*c* performs in-band carrier reservation.

Figure 10:
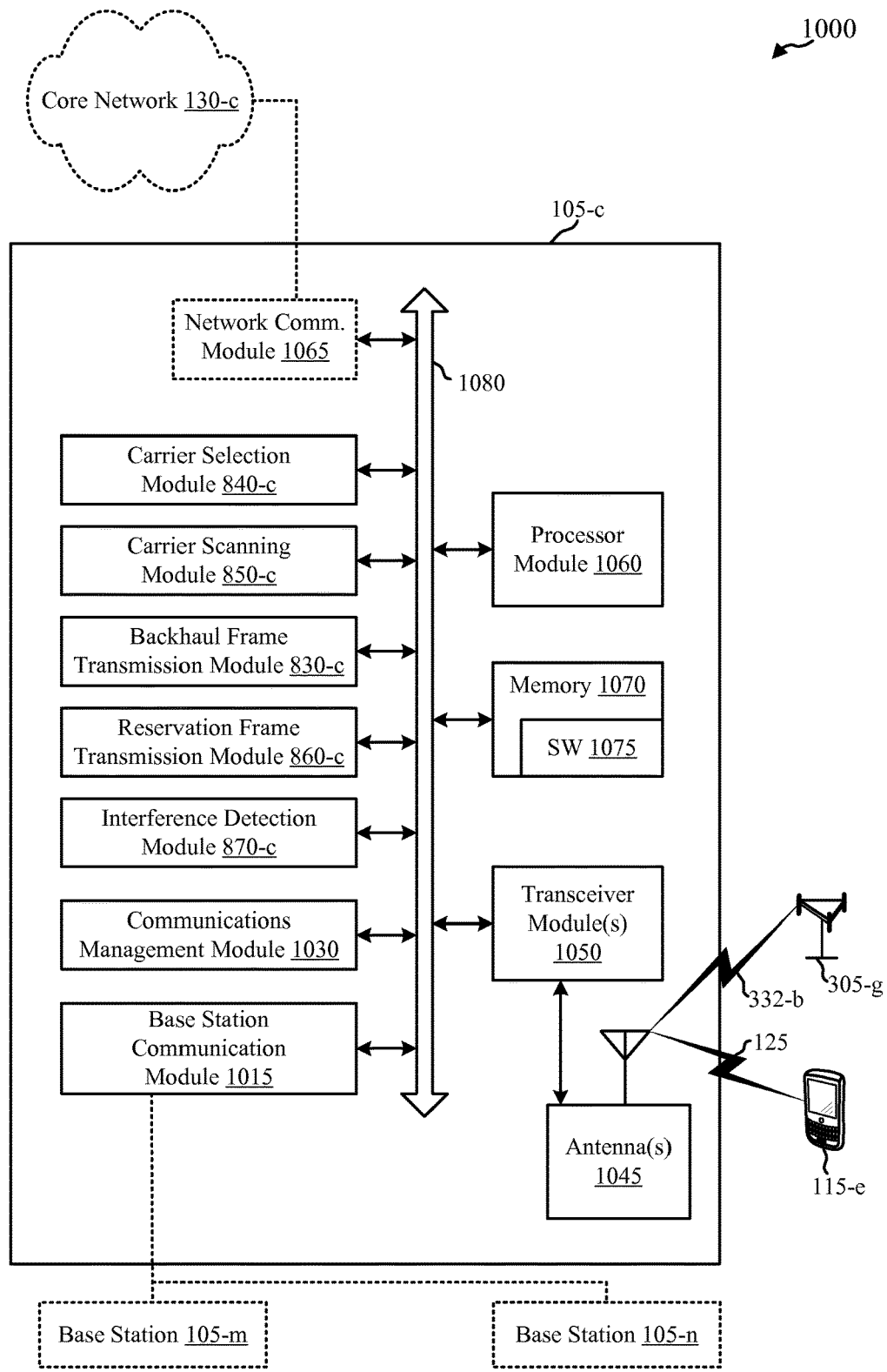
FIG. 10 shows a block diagram of a communications system that may be configured for supporting wireless backhaul in accordance with various embodiments.

FIG. 10 shows a block diagram of a communications system 1000 that may be configured for supporting wireless backhaul over unlicensed spectrum bands in accordance with various embodiments. This system 1000 may be an example of aspects of the system 100 depicted in FIG. 1, system 200 of FIG. 2, and/or system 300 of FIG. 3. The system 1000 includes a base station 105-*c* configured for communication with base station 305-*g* over wireless backhaul link 332-*b*. Base station 105-*c* may be, for example, an eNB 105 as illustrated in systems 100 and/or 200.

In some cases, the base station 105-*c* may have one or more wired backhaul links. Base station 105-*c* may be, for example, a macro eNB 105 having a wired backhaul link to the core network 130-*c*. Base station 105-*c* may be a FBS for a base station 305-*g* (e.g., femto eNB, pico eNB, and the like) via wireless backhaul communication link 332-*b*. Base station 105-*c* may also communicate with other base stations 105, such as base station 105-*m* and base station 105-*n* via inter-base station wired communication links. Each of the base stations 105 may communicate with UEs 115 using different wireless communications technologies, such as different Radio Access Technologies. In some cases, base station 105-*c* may communicate with other base stations such as 105-*m* and/or 105-*n* utilizing base station communication module 1015. In some embodiments, base station communication module 1015 may provide an X2 interface within an LTE/LTE-A wireless communication network technology to provide communication between some of the base stations 105. In some embodiments, base station 105-*c* may communicate with other base stations through core network 130-*b*.

In some cases, the base station 105-*c* may not have wired backhaul links with core network 130-*b* and/or other base stations 105. For example, base station 105-*c* may be an RBS and backhaul may be provided for base station 105-*c* by base station 305-*g* via wireless backhaul communication link 332-*b*. Base station 305-*g* may be a core entity (e.g., MME 232, Serving GW 234, etc.) or another base station 105.

The components for base station 105-*c* may be configured to implement aspects discussed above with respect to the wireless modems 700 of FIGS. 7-9 and/or the base stations 305-*e* and 305-*f* of FIGS. 8 and/or 9 and may not be repeated here for the sake of brevity. For example, the backhaul frame transmission module 830-*c* may perform similar functions as the backhaul frame transmission modules 730 and/or 830, the carrier selection module 840-*c* may perform similar functions as the carrier selection modules 740 and/or 840, the carrier scanning module 850-*c* may perform similar functions as the carrier scanning modules 750 and/or 850, the reservation frame transmission module 860-*c* may perform similar functionality as the reservation frame transmission modules 860, and the interference detection module 870-*c* may perform similar functions as the interference detection modules 870. By way of example, these modules may be components of the base station 105-*c* in communication with some or all of the other components of the base station 105-*c* via bus system 1080. Alternatively, functionality of these modules may be implemented as a component of the transceiver module 1050, as a component of a wireless modem (e.g., the wireless modem 700 of FIGS. 7, 8, and/or 9) as a computer program product, and/or as one or more controller elements of the processor module 1060.

The base station 105-*c* may include antennas 1045, transceiver modules 1050, memory 1070, and a processor module 1060, which each may be in communication, directly or indirectly, with each other (e.g., over bus system 1080). The transceiver modules 1050 may be configured to communicate bi-directionally, via the antennas 1045, with the user equipment 115-*e*, which may be a multi-mode user equipment. The transceiver module 1050 (and/or other components of the base station 105-*c*) may also be configured to communicate bi-directionally, via the antennas 1045, with one or more other base stations 305-*g*.

The memory 1070 may include random access memory (RAM) and read-only memory (ROM). The memory 1070 may also store computer-readable, computer-executable software code 1075 containing instructions that are configured to, when executed, cause the processor module 1060 to perform various functions described herein (e.g., call processing, database management, message routing, etc.). Alternatively, the software 1075 may not be directly executable by the processor module 1060 but be configured to cause the computer, e.g., when compiled and executed, to perform functions described herein.

The processor module 1060 may include an intelligent hardware device, e.g., a central processing unit (CPU) such as those made by Intel® Corporation or AMD®, a microcontroller, an application-specific integrated circuit (ASIC), etc. The processor module 1060 may include various special purpose processors such as encoders, queue processing modules, base band processors, radio head controllers, digital signal processors (DSPs), and the like.

The transceiver modules 1050 may include a modem configured to modulate the packets and provide the modulated packets to the antennas 1045 for transmission, and to demodulate packets received from the antennas 1045. The base station 105-*c* may include multiple transceiver modules 1050, each with one or more associated antennas 1045. For example, the base station 105-*c* may include a transceiver module 1050 for communication with UEs 115 using a Radio Access Technology such as LTE/LTE-A, and a separate transceiver module 1050 for communication with other base stations using the backhaul communication techniques described above.

According to the architecture of FIG. 10, the base station 105-*c* may further include a communications management module 1030. The communications management module 1030 may manage communications with other base stations 105. The communications management module may include a controller and/or scheduler for controlling communications with UEs 115 in cooperation with other base stations 105. For example, the communications management module 1030 may perform scheduling for transmissions to UEs 115 and/or various interference mitigation techniques such as beamforming and/or joint transmission.

Figure 11:
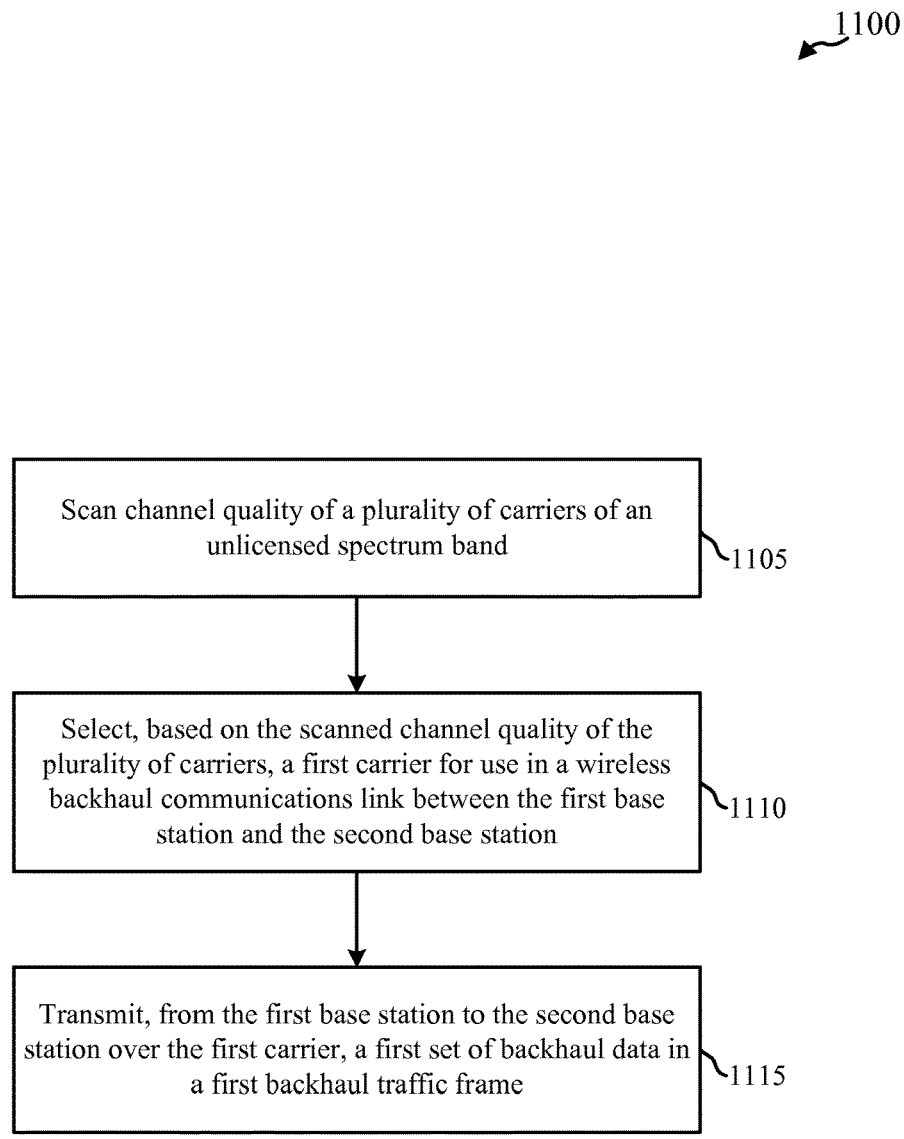
FIG. 11 illustrates a method 1100 for supporting wireless backhaul over unlicensed spectrum bands in accordance with various embodiments.

FIG. 11 illustrates a method 1100 for supporting wireless backhaul over unlicensed spectrum bands in accordance with various embodiments. The method 1100 may be used by the base stations 305 of FIGS. 3, 4, 8, and/or 9. As described above, these base stations 305 may be any node or subsystem of wireless communication networks 100 and/or 200 of FIGS. 1 and/or 2.

Method 1100 begins at block 1105 where channel quality of a plurality of carriers of an unlicensed spectrum band is scanned. At block 1110, a first carrier for use in a wireless backhaul communications link between the first base station and the second base station may be selected based on the scanned channel quality of the plurality of carriers. At block 1115, the first base station may transmit a first set of backhaul data in a first backhaul traffic frame to the second base station.

Figure 12:
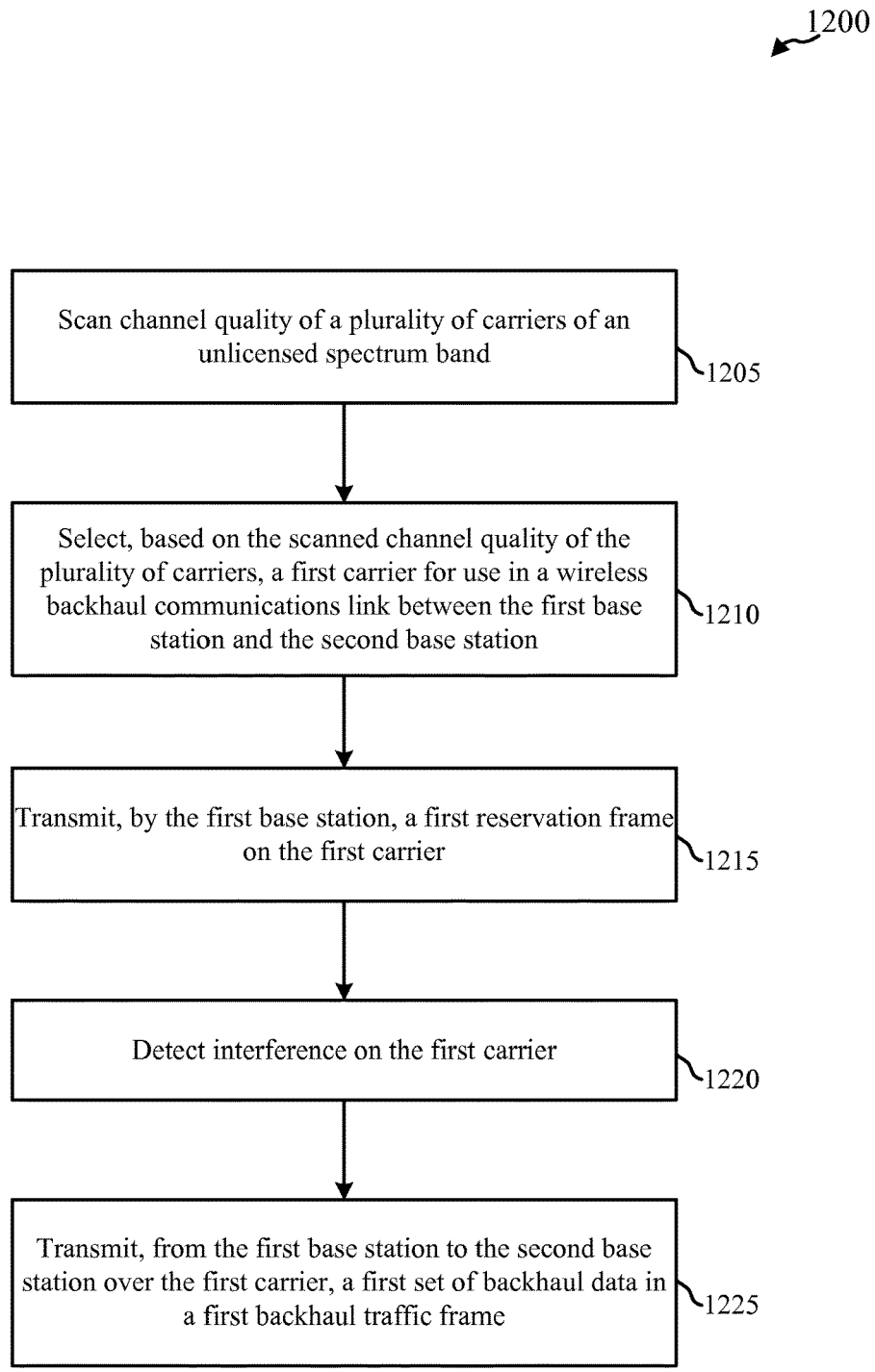
FIG. 12 illustrates a method 1200 for supporting wireless backhaul over unlicensed spectrum bands in accordance with various embodiments.

FIG. 12 illustrates a method 1200 for supporting wireless backhaul over unlicensed spectrum bands in accordance with various embodiments. The method 1200 may be used by the base stations 305 of FIGS. 3, 4, 8, and/or 9. As described above, these base stations 305 may be any node or subsystem of wireless communication networks 100 and/or 200 of FIGS. 1 and/or 2.

Method 1200 begins at block 1205 where channel quality of a plurality of carriers of an unlicensed spectrum band is scanned. At block 1210, a first carrier for use in a wireless backhaul communications link between the first base station and the second base station may be selected based on the scanned channel quality of the plurality of carriers.

At block 1215, the first base station may transmit a first reservation frame on the first carrier. At block 1220, interference may be detected on the first carrier. At block 1225, the first base station may transmit a first set of backhaul data in a first backhaul traffic frame to the second base station based on the detected interference level being below a predetermined threshold.

While the foregoing examples are given in the context of backhaul communications between base stations, it will be apparent to one of ordinary skill in the art that the principles of the present disclosure may be applied to other communications outside the realm of inter-base station backhaul communications. For example, aspects of the foregoing examples may be employed in LTE/LTE-A communications between multiple wireless devices (e.g., UEs) communicating in an unlicensed spectrum. In further embodiment, one or more base stations as illustrated in the description above may be replaced with a mobile device such as a UE. In such instances, the techniques disclosed herein may be employed to allow a UE to communicate with either a base station or another UE over the unlicensed spectrum.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). In addition, as used herein, the term "partly" is used interchangeably with "substantially" as described in the specification.

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method for wireless backhaul communications between a first base station and a second base station of a wireless communications network, the method comprising:
   scanning channel quality of a plurality of carriers of an unlicensed spectrum band;
   selecting, based on the scanned channel quality of the plurality of carriers, a first carrier for use in a wireless backhaul communications link between the first base station and the second base station;
   transmitting, by the first base station, a first reservation frame on the first carrier, wherein the first reservation frame is associated with a duration of a carrier reservation;
   transmitting, from the first base station to the second base station over the first carrier within the duration of the carrier reservation, a first set of backhaul data in a first backhaul traffic frame;
   selecting, based on the scanned channel quality of the plurality of carriers, a second carrier for the wireless backhaul communications link between the first base station and the second base station for use subsequent to the first backhaul traffic frame;
   transmitting, by the first base station, a second reservation frame on the second carrier prior to the expiration of the duration of the carrier reservation and after the transmission of the first set of backhaul data in the first backhaul traffic frame; and
   transmitting, from the first base station to the second base station over the second carrier, a second set of backhaul data in a second backhaul traffic frame.

2. The method of claim 1, further comprising:
   detecting interference on the first carrier; and
   proceeding with transmitting the first backhaul traffic frame over the first carrier based on a level of the detected interference being below a predetermined threshold.

3. The method of claim 2, further comprising:
   receiving, from the second base station and at the first base station over the first carrier, a third set of backhaul data time division duplexed within the first backhaul traffic frame.

4. The method of claim 2, further comprising:
   detecting interference on the second carrier; and
   receiving, from the second base station and at the first base station over the second carrier, a third set of backhaul data in the second backhaul traffic frame.

5. The method of claim 1, wherein one or both of the first reservation frame and the second reservation frame comprise a clear to send (CTS) frame of a wireless local area network (WLAN) protocol.

6. The method of claim 1, further comprising:
   detecting interference on the second carrier, wherein transmitting the second set of backhaul data in the second backhaul traffic frame is based on the detecting.

7. The method of claim 1, wherein the scanning channel quality comprises cyclically determining channel quality of the plurality of carriers, and wherein the selecting the first carrier comprises updating the selected first carrier responsive to determining that channel quality for the selected first carrier is relatively lower than channel quality of one or more unselected carriers.

8. An apparatus for wireless backhaul communications between a first base station and a second base station of a wireless communications network, comprising:
   means for scanning channel quality of a plurality of carriers of an unlicensed spectrum band;
   means for selecting, based on the scanned channel quality of the plurality of carriers, a first carrier for use in a wireless backhaul communications link between the first base station and the second base station;
   means for transmitting, by the first base station, a first reservation frame on the first carrier, wherein the first reservation frame is associated with a duration of a carrier reservation;
   means for transmitting, from the first base station to the second base station over the first carrier within the duration of the carrier reservation, a first set of backhaul data in a first backhaul traffic frame;
   means for selecting, based on the scanned channel quality of the plurality of carriers, a second carrier for the wireless backhaul communications link between the first base station and the second base station for use subsequent to the first backhaul traffic frame;
   means for transmitting, by the first base station, a second reservation frame on the second carrier prior to the expiration of the duration of the carrier reservation and after the transmission of the first set of backhaul data in the first backhaul traffic frame; and
   means for transmitting, from the first base station to the second base station over the second carrier, a second set of backhaul data in a second backhaul traffic frame.

9. The apparatus of claim 8, further comprising:
   means for detecting interference on the first carrier; and
   means for proceeding with transmitting the first backhaul traffic frame over the first carrier based on a level of the detected interference being below a predetermined threshold.

10. The apparatus of claim 9, further comprising:
means for receiving, from the second base station and at the first base station over the first carrier, a third set of backhaul data time division duplexed within the first backhaul traffic frame.

11. The apparatus of claim 9, further comprising:
means for detecting interference on the second carrier; and
means for receiving, from the second base station and at the first base station over the second carrier, a third set of backhaul data in the second backhaul traffic frame.

12. The apparatus of claim 8, further comprising:
means for detecting interference on the second carrier, wherein the means for transmitting the second set of backhaul data in the second backhaul traffic frame is based on the detecting.

13. The apparatus of claim 8, wherein the means for scanning channel quality comprises means for cyclically determining channel quality of the plurality of carriers, and wherein the selecting the first carrier comprises updating the selected first carrier responsive to determining that channel quality for the selected first carrier is relatively lower than channel quality of one or more unselected carriers.

14. A communications device for wireless backhaul communications between a first base station and a second base station of a wireless communications network, comprising:
a wireless networking transceiver configured to scan channel quality of a plurality of carriers of an unlicensed spectrum band;
a backhaul transceiver in communication with the wireless networking transceiver; and
a wireless modem configured to:
select, based on the scanned channel quality of the plurality of carriers, a first carrier for use in a wireless backhaul communications link between the first base station and the second base station;
transmit, by the first base station, a first reservation frame on the first carrier, wherein the first reservation frame is associated with a duration of a carrier reservation;
transmit, from the first base station to the second base station over the first carrier within the duration of the carrier reservation, a first set of backhaul data in a first backhaul traffic frame;
select, based on the scanned channel quality of the plurality of carriers, a second carrier for the wireless backhaul communications link between the first base station and the second base station for use subsequent to the first backhaul traffic frame;
transmit, by the first base station, a second reservation frame on the second carrier prior to the expiration of the duration of the carrier reservation and after the transmission of the first set of backhaul data in the first backhaul traffic frame; and
transmit, from the first base station to the second base station over the second carrier, a second set of backhaul data in a second backhaul traffic frame.

15. The communications device of claim 14, wherein the wireless modem is further configured to detect interference on the first carrier, and wherein the backhaul transceiver is configured to proceed with transmitting the first backhaul traffic frame over the first carrier based on a level of the detected interference being below a predetermined threshold.

16. The communications device of claim 15, wherein the wireless modem is further configured to:
receive, from the second base station and at the first base station over the first carrier, a third set of backhaul data time division duplexed within the first backhaul traffic frame.

17. The communications device of claim 15, wherein the wireless modem is further configured to:
detect interference on the second carrier; and
receive, from the second base station and at the first base station over the second carrier, a third set of backhaul data in the second backhaul traffic frame.

18. The communications device of claim 14, wherein the wireless modem is further configured to:
detect interference on the second carrier, wherein transmitting the second set of backhaul data in the second backhaul traffic frame is based on the detecting.

19. The communications device of claim 14, wherein the wireless modem is further configured to:
cyclically determine channel quality of the plurality of carriers; and
update the selected first carrier responsive to determining that channel quality for the selected first carrier is relatively lower than channel quality of one or more unselected carriers.

20. A computer program product for wireless backhaul communications between a first base station and a second base station of a wireless communications network, comprising:
a non-transitory computer-readable medium comprising:
code for causing a computer to scan channel quality of a plurality of carriers of an unlicensed spectrum band;
code for causing the computer to select, based on the scanned channel quality of the plurality of carriers, a first carrier for use in a wireless backhaul communications link between the first base station and the second base station;
code for causing the computer to transmit, by the first base station, a first reservation frame on the first carrier, wherein the first reservation frame is associated with a duration of a carrier reservation;
code for causing the computer to transmit, from the first base station to the second base station over the first carrier within the duration of the carrier reservation, a first set of backhaul data in a first backhaul traffic frame;
code for causing the computer to select, based on the scanned channel quality of the plurality of carriers, a second carrier for the wireless backhaul communications link between the first base station and the second base station for use subsequent to the first backhaul traffic frame;
code for causing the computer to transmit, by the first base station, a second reservation frame on the second carrier prior to the expiration of the duration of the carrier reservation and after the transmission of the first set of backhaul data in the first backhaul traffic frame; and
code for causing the computer to transmit, from the first base station to the second base station over the second carrier, a second set of backhaul data in a second backhaul traffic frame.

21. The computer program product of claim 20, wherein the non-transitory computer-readable medium further comprises:
code for causing the computer to detect interference on the first carrier; and code for causing the computer to proceed with transmitting the first backhaul traffic frame over the first carrier based on a level of the detected interference being below a predetermined threshold.

22. The computer program product of claim 21, wherein the non-transitory computer-readable medium further comprises:
   code for causing the computer to receive, from the second base station and at the first base station over the first carrier, a third set of backhaul data time division duplexed within the first backhaul traffic frame.

23. The computer program product of claim 21, wherein the non-transitory computer-readable medium further comprises:
   code for causing the computer to detect interference on the second carrier; and
   code for causing the computer to receive, from the second base station and at the first base station over the second carrier, a third set of backhaul data in the second backhaul traffic frame.

24. The computer program product of claim 20, wherein one or both of the first reservation frame and the second reservation frame comprise a clear to send (CTS) frame of a wireless local area network (WLAN) protocol.

25. The computer program product of claim 24, wherein the first backhaul traffic frame comprises a backhaul optimized traffic frame not compatible with the WLAN protocol.

26. The computer program product of claim 20, wherein the non-transitory computer-readable medium further comprises:
   code for causing the computer to detect interference on the second carrier, wherein transmitting the second set of backhaul data in the second backhaul traffic frame is based on the detecting.

27. The computer program product of claim 20, wherein the code for causing the computer to scan channel quality comprises code for causing the computer to cyclically determine channel quality of the plurality of carriers, and wherein the code for causing the computer to select the first carrier comprises code for causing the computer to update the selected first carrier responsive to determining that channel quality for the selected first carrier is relatively lower than channel quality of one or more unselected carriers.

28. The computer program product of claim 20, wherein the unlicensed spectrum band comprises a shared spectrum band open for use by wireless local area networks (WLANs).

29. The computer program product of claim 20, wherein:
   the channel quality scanning of the pluarality of carriers is performed by a WLAN transceiver; and
   the transmitting of the first backhaul traffic frame is performed by a backhaul transceiver.

* * * * *